(12) United States Patent  
Lanigan, Sr. et al.

(10) Patent No.: US 9,574,363 B1  
(45) Date of Patent: Feb. 21, 2017

(54) SYSTEM AND METHOD OF HANDLING CHASSIS

(75) Inventors: John J. Lanigan, Sr., Orland Park, IL (US); John J. Lanigan, Jr., New Lenox, IL (US); Antonio Carlos Callado de Souza, Orland Park, IL (US); Myron Glickman, Arlington Heights, IL (US); Ralph Swanson, Lockport, IL (US); Ken Svihlik, Orland Park, IL (US); William P. Healy, Wheaton, IL (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 771 days.

(21) Appl. No.: 13/175,526

(22) Filed: Jul. 1, 2011

(51) Int. Cl.  
*B65G 1/06* (2006.01)  
*B65G 67/02* (2006.01)  
*B65G 67/12* (2006.01)  
*E04H 6/12* (2006.01)  
*E04H 6/18* (2006.01)

(52) U.S. Cl.  
CPC *E04H 6/12* (2013.01); *B65G 1/06* (2013.01); *B65G 67/02* (2013.01); *B65G 67/12* (2013.01); *E04H 6/182* (2013.01)

(58) Field of Classification Search  
CPC ........... B65G 1/06; B65G 67/00; B65G 67/02; E04H 6/00; E04H 6/12; E04H 6/182  
USPC ................. 414/253, 259, 260, 264, 266–286  
See application file for complete search history.

(56) References Cited

U.S. PATENT DOCUMENTS

| | | | |
|---|---|---|---|
| 2,238,573 A | * | 4/1941 | Steedman ..................... 187/208 |
| 3,519,150 A | * | 7/1970 | Keenan et al. ............... 414/273 |
| 4,427,117 A | | 1/1984 | Matthewson et al. |
| 4,437,807 A | | 3/1984 | Perrott |
| 4,439,094 A | | 3/1984 | Riley |
| 4,549,663 A | | 10/1985 | Corbett, Jr. et al. |
| 4,600,350 A | | 7/1986 | Matthewson et al. |
| 4,826,384 A | | 5/1989 | Okura et al. |
| 4,936,730 A | * | 6/1990 | Morioka ................. E04H 6/282 414/239 |

(Continued)

FOREIGN PATENT DOCUMENTS

| | | |
|---|---|---|
| CN | 1814517 | 8/2006 |
| DE | 202006002586 | 5/2006 |

(Continued)

OTHER PUBLICATIONS

International Search Report and Written Opinion, for International Application No. PCT/US13/23282, Applicant, Mi-Jack Products, Inc., dated Apr. 15, 2013 (15 pages).

(Continued)

*Primary Examiner* — Michael McCullough  
*Assistant Examiner* — Ashley Romano  
(74) *Attorney, Agent, or Firm* — McCracken & Gillen LLC

(57) ABSTRACT

A method (100) for handling chassis is disclosed. The method (100) can include: providing (110) a multi-level structure including a plurality of levels including a first level with an opening to receive a chassis and a second level; locating (120) a plurality of shelves adjacent to the opening including a port shelf and a starboard shelf, each configured to receive a chassis; and providing (130) an transfer mechanism configured to pick a chassis and place it on one of the plurality of shelves. The method allows compact storage, stacking and retrieving and inventorying of chassis, for enhanced logistics.

12 Claims, 13 Drawing Sheets

(56) References Cited

U.S. PATENT DOCUMENTS

| | | | |
|---|---|---|---|
| 4,952,118 A | 8/1990 | Macmillan | |
| 4,971,506 A * | 11/1990 | Givati | E04H 6/22 |
| | | | 414/228 |
| 5,551,831 A | 9/1996 | Corbett | |
| 6,325,586 B1 | 12/2001 | Loy | |
| 6,345,948 B1 * | 2/2002 | Irish | E04H 6/424 |
| | | | 414/234 |
| 6,626,304 B1 | 9/2003 | Corbett et al. | |
| 7,316,536 B2 | 1/2008 | Evans et al. | |
| 8,613,582 B2 * | 12/2013 | Shani | E04H 6/22 |
| | | | 414/232 |
| 2005/0220559 A1 | 10/2005 | Yang et al. | |
| 2007/0032903 A1 | 2/2007 | Tsujimoto | |
| 2007/0128009 A1 * | 6/2007 | Lee | 414/253 |
| 2008/0075566 A1 * | 3/2008 | Benedict | E04H 6/182 |
| | | | 414/228 |
| 2008/0075568 A1 | 3/2008 | Benedict et al. | |
| 2008/0075569 A1 | 3/2008 | Benedict et al. | |
| 2008/0208389 A1 * | 8/2008 | Checketts | 700/214 |
| 2009/0261546 A1 | 10/2009 | Rowland | |
| 2010/0034626 A1 * | 2/2010 | Reiniger | E04H 6/183 |
| | | | 414/253 |
| 2010/0183409 A1 * | 7/2010 | Checketts et al. | 414/231 |
| 2010/0189534 A1 | 7/2010 | Jung | |
| 2010/0232926 A1 | 9/2010 | Awad | |
| 2010/0284771 A1 * | 11/2010 | Stierler | E04H 6/422 |
| | | | 414/234 |

FOREIGN PATENT DOCUMENTS

| | | |
|---|---|---|
| FR | 2879576 | 6/2006 |
| GB | 2183620 | 6/1987 |
| JP | 58122232 | 7/1983 |
| JP | 60031440 | 2/1985 |
| JP | 62065498 | 4/1987 |
| JP | 62088704 | 4/1987 |
| JP | 63160912 | 7/1988 |
| JP | 63167849 | 7/1988 |
| JP | 63185702 | 8/1988 |
| JP | 01117104 | 5/1989 |
| JP | 01172113 | 7/1989 |
| JP | 04060068 | 2/1992 |
| JP | 05338745 | 12/1993 |
| JP | 06115649 | 4/1994 |
| JP | 07112808 | 5/1995 |

OTHER PUBLICATIONS

International Preliminary Report on Patentability, for International Application No. PCT/US13/23282, Applicant, Mi-Jack Products, Inc., dated Aug. 7, 2014 (6 pages).

Supplementary European Search Report, for EP13740687.2, Applicant, Mi-Jack Products, Inc., dated Nov. 16, 2015 (6 pages).

* cited by examiner

SYSTEM AND METHOD OF HANDLING CHASSIS

FIELD OF THE INVENTION

This invention relates to the transportation and logistics industry, and more particularly to a system and method of handling chassis.

BACKGROUND OF THE INVENTION

Containerization continues to grow at a rapid pace in connection with the intermodal industry. Land at rail and shipping terminals and distribution hubs is at a premium. There is generally a scarce amount of land for expansion to store and accommodate chassis storage on the ground level. With the shortage of land in terminals and hubs, there is a need to better utilize space.

There is a need to handle and store chassis in more efficient ways that have minimal land requirements and footprints.

There is a need to be able to handle, accommodate and temporarily store, a high volume of chassis in proximity to terminals, hubs and the like that accommodate chassis, with multi-level storage stalls or racks.

Bottlenecks are seen in existing rail terminals and hubs, which result in freight delays. Terminal and hub operators would desire to use scarce land for more efficient uses then chassis storage. There is a myriad of potential inefficiencies associated with handling and accessing chassis. For example, ground level storage areas can be cluttered with poorly parked chassis, chassis can be difficult to find or difficult to access, damaged chassis can be intermingled with undamaged ones, etc. which can introduce significant delays, costs and inefficiencies.

In more detail, truck line carriers typically return a chassis to a ground level storage. The truck line carrier or driver can damage a chassis during operation and can deliberately or erroneously deposit the chassis in the "usable chassis area", which is the area designated as serviced and approved to use. This way the truck line carrier or driver avoids a damage claim being made. There is a need to minimize and prevent damage claims not being reported, called "phantom damage".

In further detail, when a subsequent driver picks up a damaged chassis in a ground level storage area and is not aware that the chassis is damaged, unsafe or in need of maintenance, this causes major delays and costs. The driver may not recognize there is damage to the chassis, until a container is placed onto the chassis. Now the container has to be off loaded and the damaged chassis must be taken out of service, and a new undamaged chassis must be put in service. These kind of problems can cause hours of delay for drivers, operations personnel and crane operators. There is a need to minimize erroneous use of damaged chassis.

There is a need to provide a method and device that minimizes the possibility of placing a damaged chassis in service.

There is a need to provide a method and device that minimizes the possibility of placing a damaged chassis in service, by providing a method for examining that inbound chassis are substantially undamaged before they can are placed back in service.

Thus, there is a need for the development of new technologies to improve the efficiency of freight and chassis transfer operations at terminals and distribution facilities.

BRIEF DESCRIPTION OF THE DRAWINGS

FIG. 3 is a perspective left side view of an embodiment of the system of handling a chassis with a transfer mechanism shown in place to pick up a chassis, in accordance with the instant invention.

FIG. 4 is a perspective left side view of an embodiment of the system of handling a chassis with a transfer mechanism shown in place directly above and in contact to pick up a chassis, in accordance with the instant invention.

FIG. 5 is an enlarged perspective left side view of an embodiment of the system of handling a chassis with a transfer mechanism shown in place directly above and in contact to pick up a chassis as shown in FIG. 4, with interconnecting structure shown moved inwardly and connected to the chassis in accordance with the instant invention.

FIG. 6 is a frontal perspective view of an embodiment of the system of handling a chassis with the transfer mechanism elevated and a chassis interconnected with the interconnecting structure, and a hoist mechanism is shown in a middle position between a plurality of shelves shown, in accordance with the instant invention.

FIG. 7 is an elevated frontal view of an embodiment of the system of handling a chassis with the transfer mechanism elevated, the interconnecting structure interconnected with a chassis, and a hoist mechanism shown in a middle position between a plurality of shelves shown the hoist mechanism is movable in a port direction 262 or starboard direction 264, to place the chassis in a desired shelf, in accordance with the instant invention.

DESCRIPTION OF A PREFERRED EMBODIMENT

Figure 1:
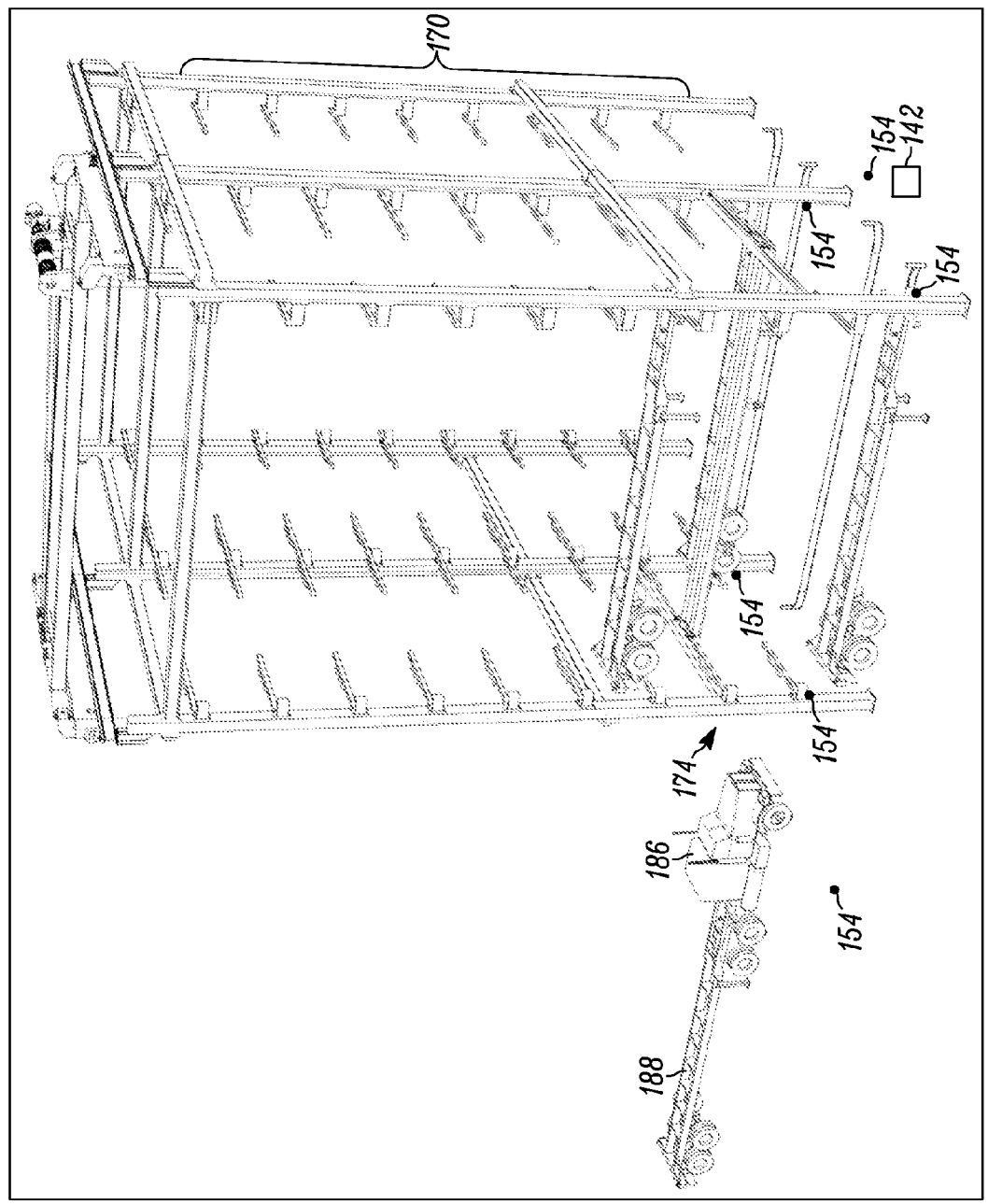
FIG. 1 is an elevated side perspective view of an embodiment of a system and method of handling chassis, in accordance with the instant invention.
Figure 13:
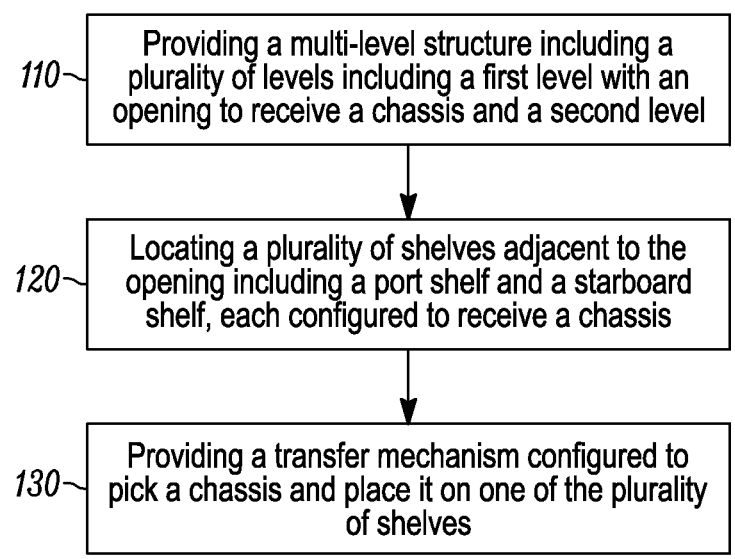
FIG. 13 is a block diagram of an embodiment of the method of handling a chassis, in accordance with the instant invention.

Referring to FIGS. 1 and 13, an exemplary method 100 for handling chassis is shown. It can include the steps of: providing 110 a multi-level structure including a plurality of levels 170 including a first level 172 with an opening 174 to receive a chassis 176 and a second level 178; locating 120 a plurality of shelves 180 adjacent to the opening 174 including a port shelf 182 and a starboard shelf 184, each configured to receive a chassis 176; and providing 130 a transfer mechanism 230 configured to pick a chassis 176 and place it on one of the plurality of shelves 180.

Advantageously, the method 100 provides an efficient method for storing, densely packing and retrieving chassis, in proximity to where they are typically used. This method 100 includes a versatile structure and enables an enhanced process for handing off chassis inbound and outbound. The method is particularly adapted for use in connection with a water or rail port, distribution hub and warehouse.

In one case, the opening 174 is at a ground level and is adapted and complementarily configured to allow a vehicular hauler 186 and a chassis 176 to pass there through, for efficient entering and exiting, and is otherwise substantially unobstructed for simplified traffic flow. The opening can include one or more lanes, depending on traffic flow, for example.

As shown in the figures, the plurality of shelves 180 are complementarily configured to receive and support most conventionally dimensioned or standard sized chassis, from a side and supported from a bottom, for easy handling.

Figure 2:
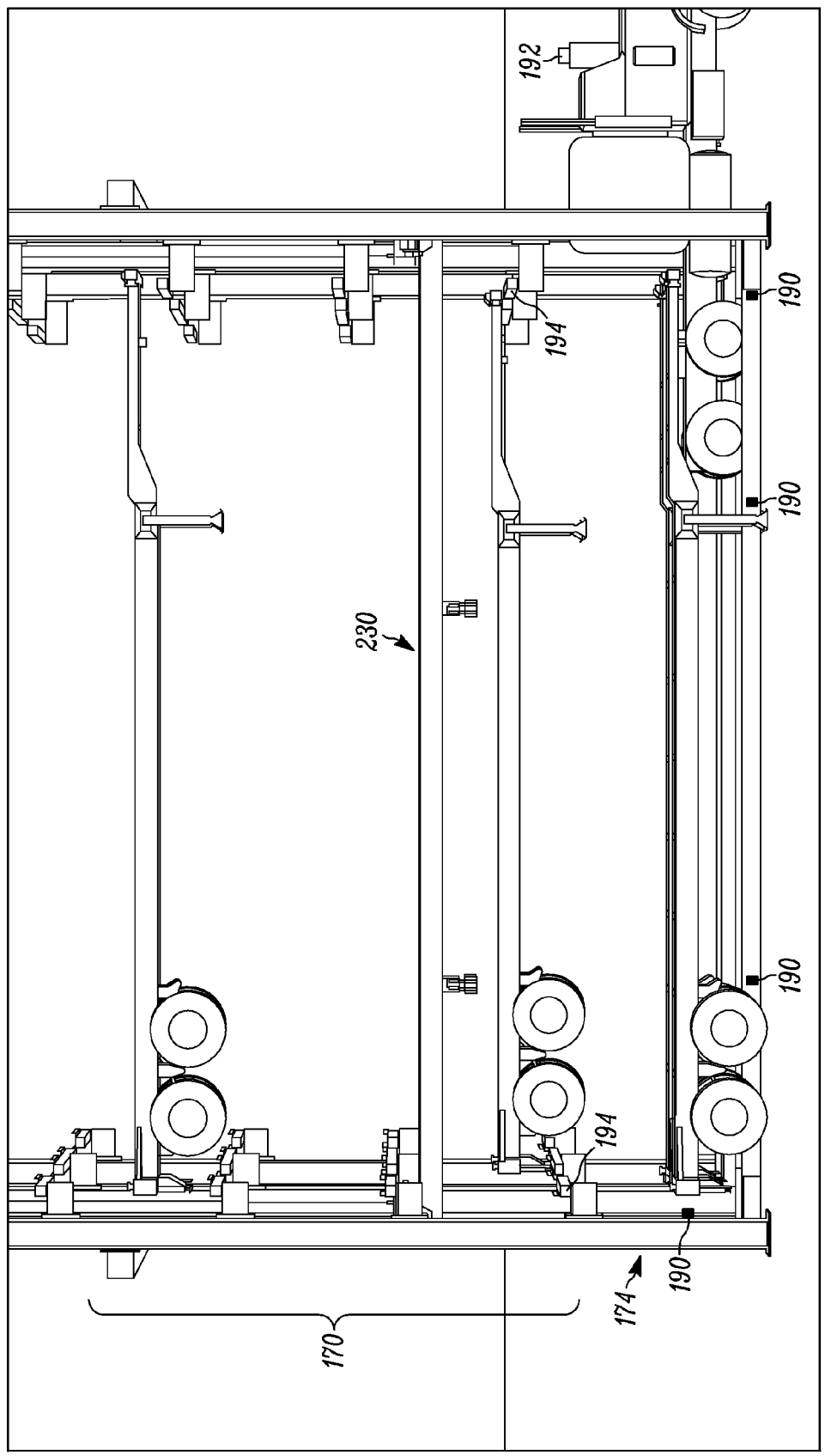
FIG. 2 is a right side view of an embodiment of the system of handling a chassis with a vehicular hauler about to drop off a chassis, in accordance with the instant invention.

As shown in FIG. 2, the method can include sensors 190 or monitors for proper alignment of the chassis in the opening and displays 192 for indicating proper positioning, prior to permitting movement of the transfer mechanism. Proper alignment can facilitate handling of a chassis.

Figure 3:
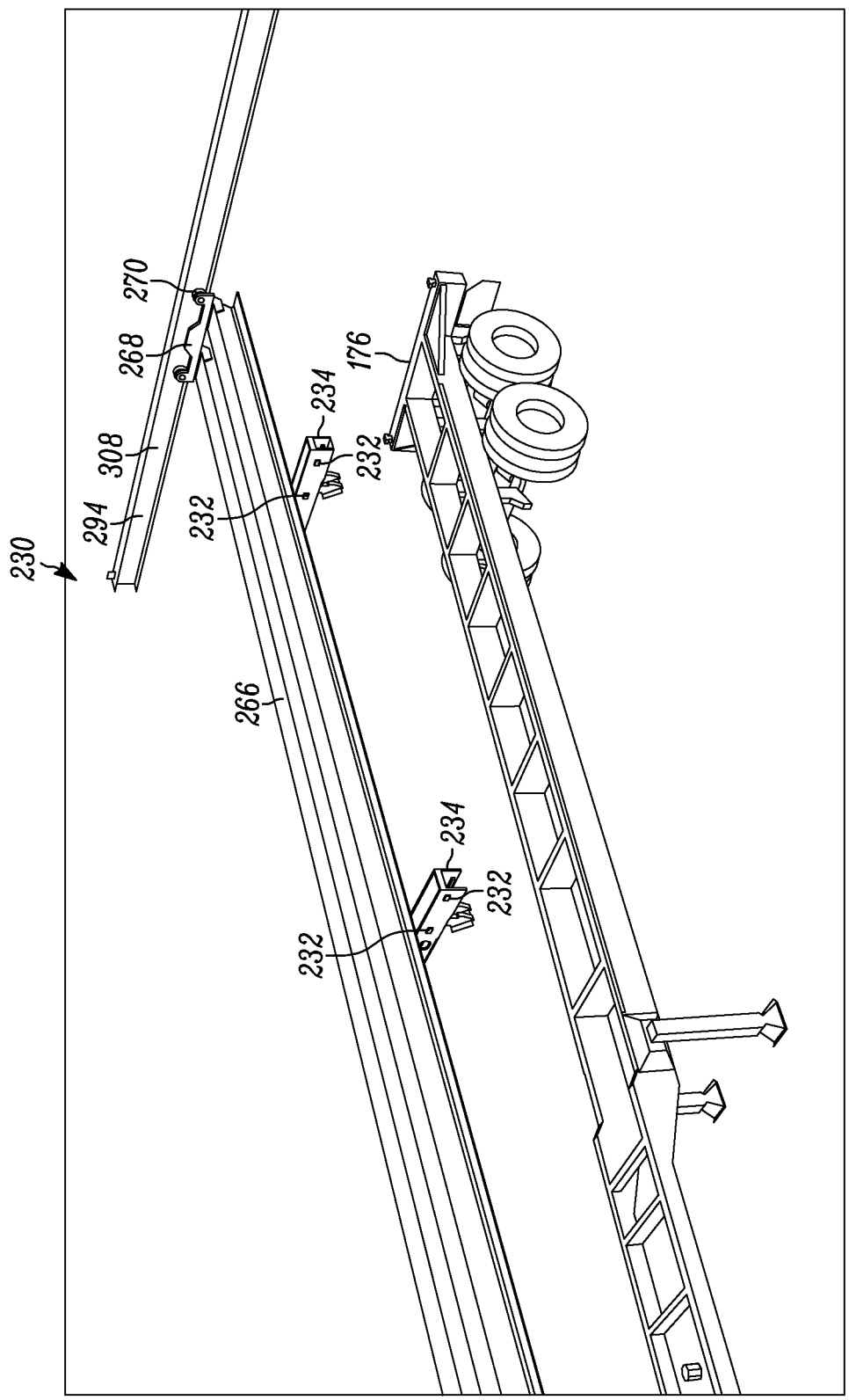
FIGS. 3-7 are simplified elevated perspective views of a sequence of steps relating to the distribution system in FIG. 2.
Figure 4:
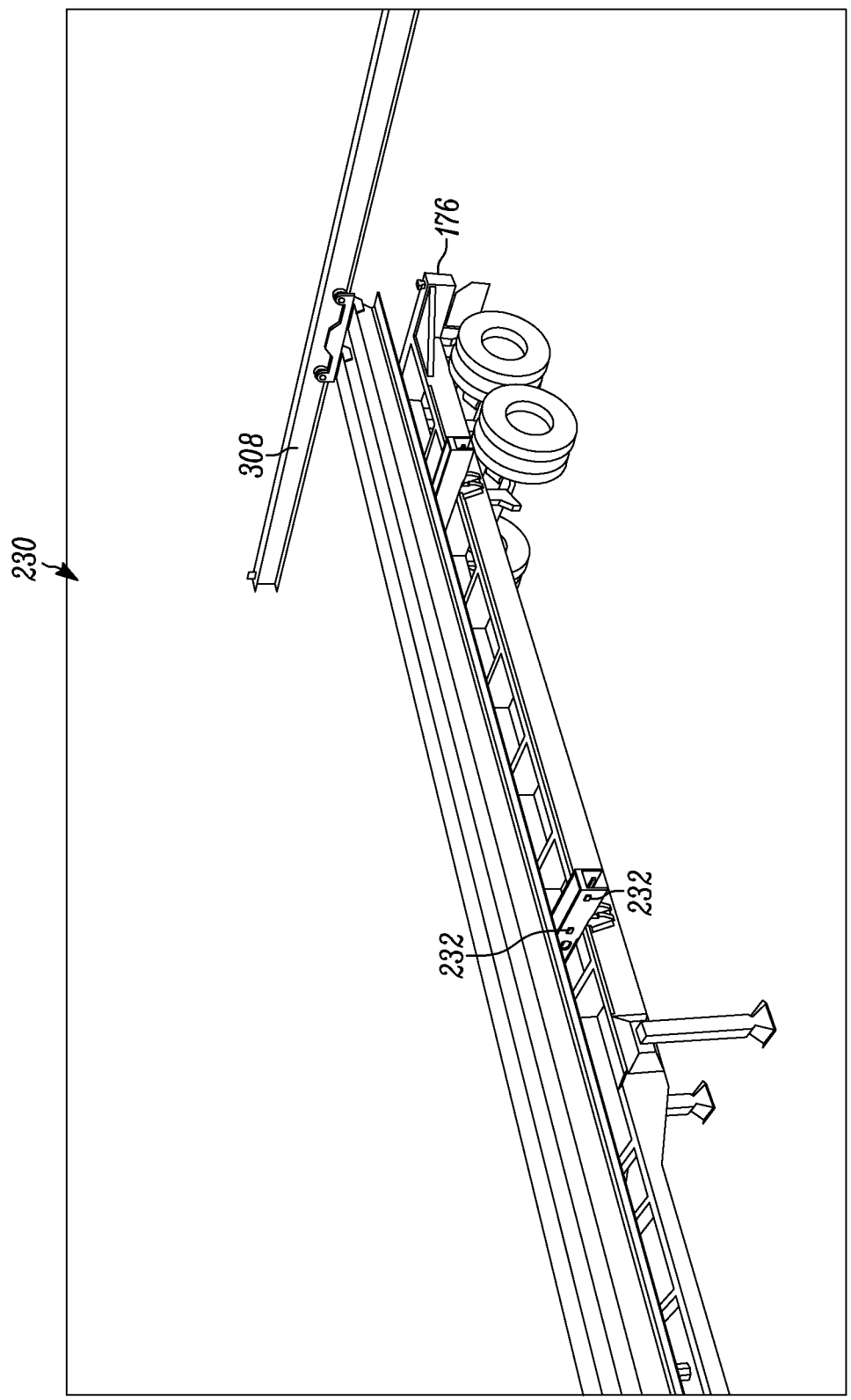
Figure 5:
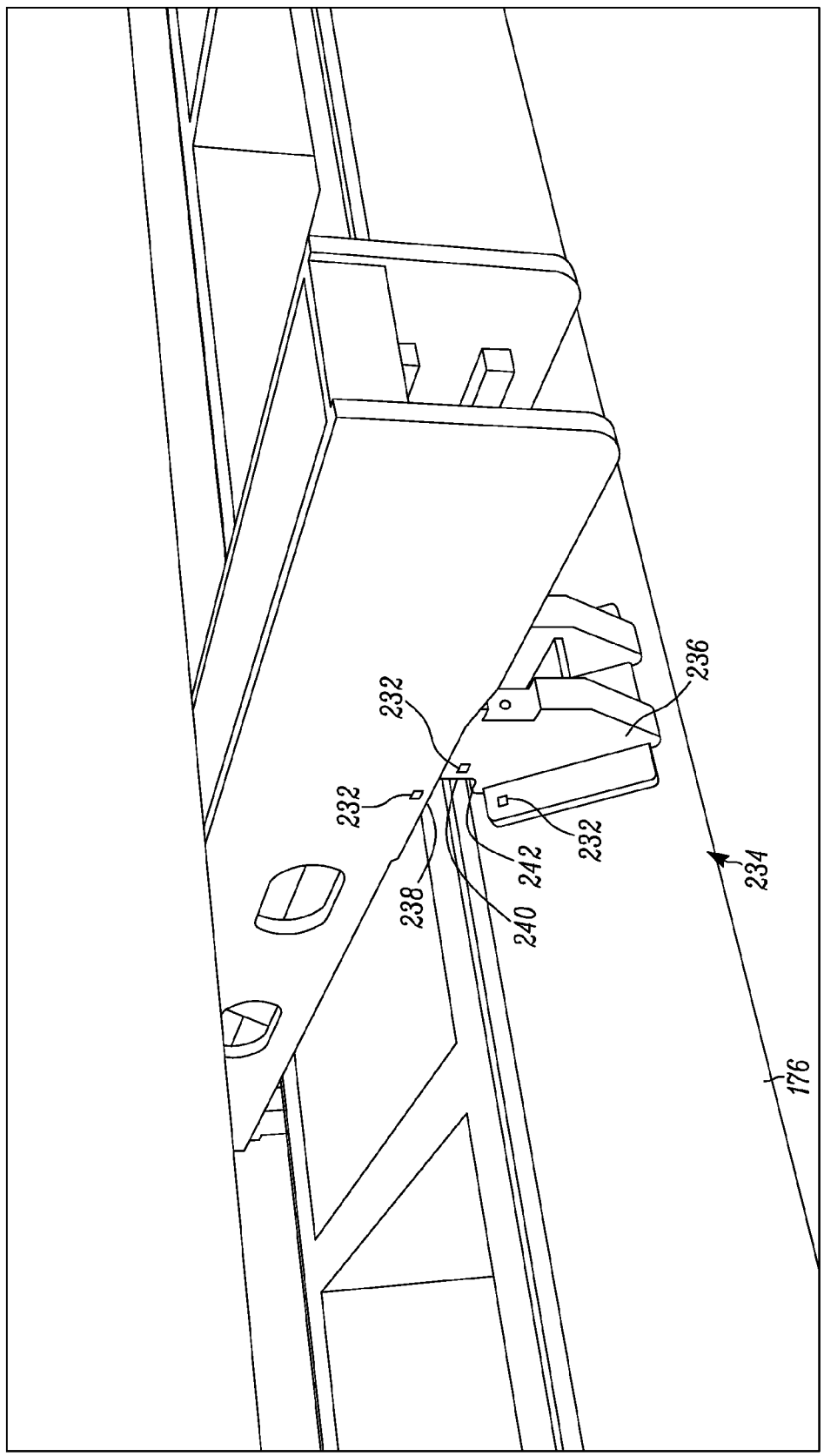

The transfer mechanism 230, in one use case, is configured to be lowered to a chassis 170, as shown in FIG. 3, connected to the chassis 176, as shown in FIGS. 4 and 5, raised with the chassis, and trolleyed, horizontally to side load a shelf 180 generally horizontally with a trolley 260, to a port shelf 182 or starboard shelf 184, as shown by direction arrows 262 and 264, as shown in FIG. 16.

In one embodiment, the transfer mechanism 230 includes sensor monitors 232 strategically positioned throughout the system, for example, to provide alignment information, interconnection information, position information, docking information, etc. For example, one set of sensor/monitors 232 in FIGS. 3-5, can be utilized to provide proper alignment and connection information, as to whether a chassis 176 and the interconnecting structure 234, or claw structure, are properly interconnected, before proceeding further. If properly interconnected/sensed, the operation is allowed to continue, and if not, prompts can be displayed to a control center, driver or system operator, as to possible next steps.

The interconnecting structure 234 in FIGS. 4 and 5, can include four claw structures 236 including three connections including a first connection 238, a second connection 240 and a third connection 242 to receive securely connect to a complementarily configured chassis.

Figure 6:
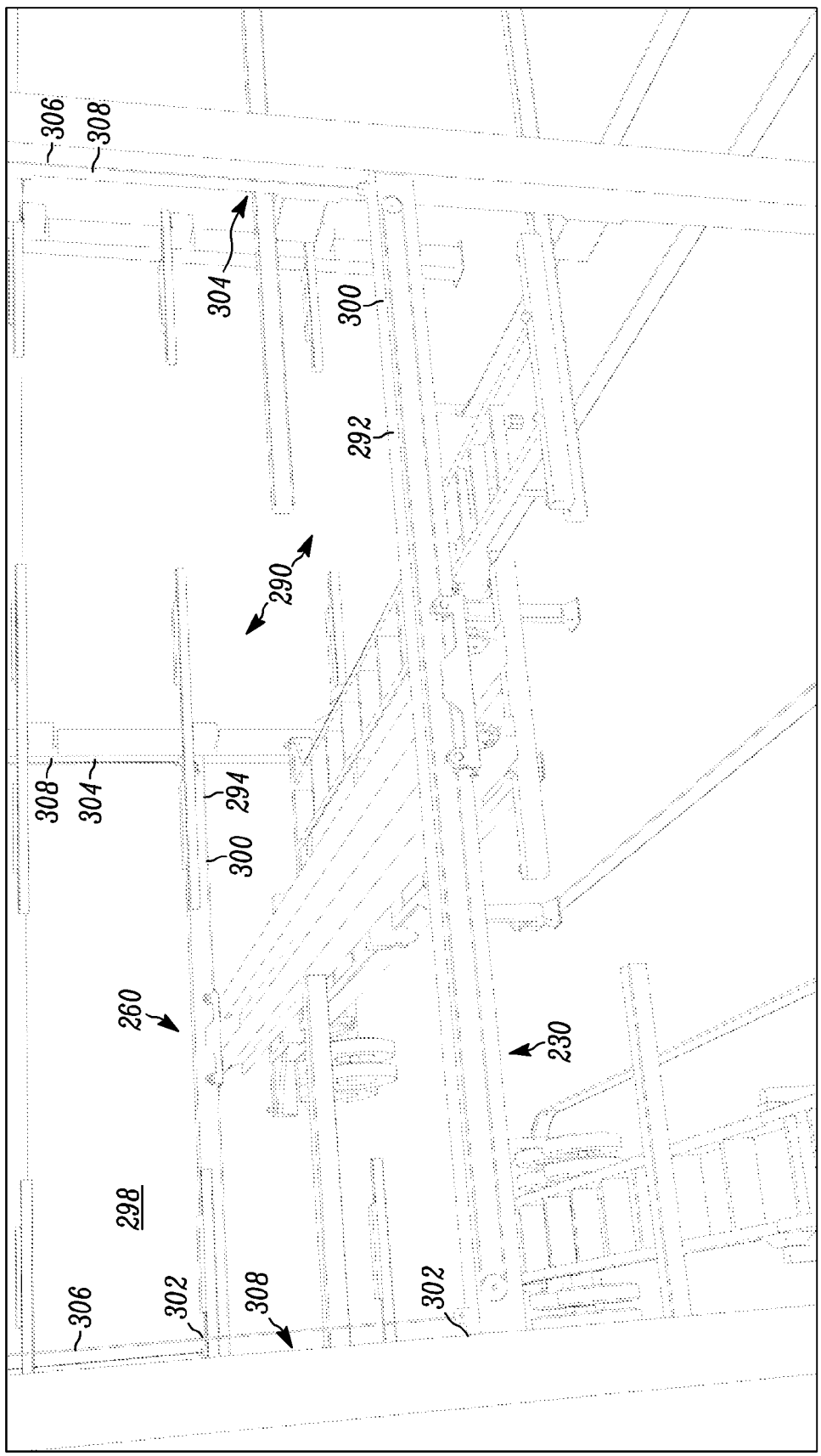

As shown in FIG. 6, the transfer mechanism 230 can further include a hoisting mechanism 290 including lateral elevation supports 292 and 294 in proximity to a bow 296 and a stern 298, the lateral elevation supports 292 and 294 including a port end 300 and a starboard end 302 configured to move vertically along and partially in a channel 304, defining a first vertical track 308.

As should be understood, the details relative to the running of cables, circuits, and motors are not detailed herein. They can be understood by those skilled in the art. As shown in FIG. 6, the hoisting mechanism 290 includes cables 306, connected to a motor and pulleys, for raising and lowering. The cabling 306 is shown connected near the port end 300 and starboard end 302, for stable and level raising and lowering of the transfer mechanism 230. The track 308 helps to minimize undesirable sway and provides good vertical and horizontal alignment. The track 308 further adds stabilization during lateral trolley movement. In more detail, the channel 304 is complementarily configured to receive the port end 300 and the starboard end 302.

Figure 7:
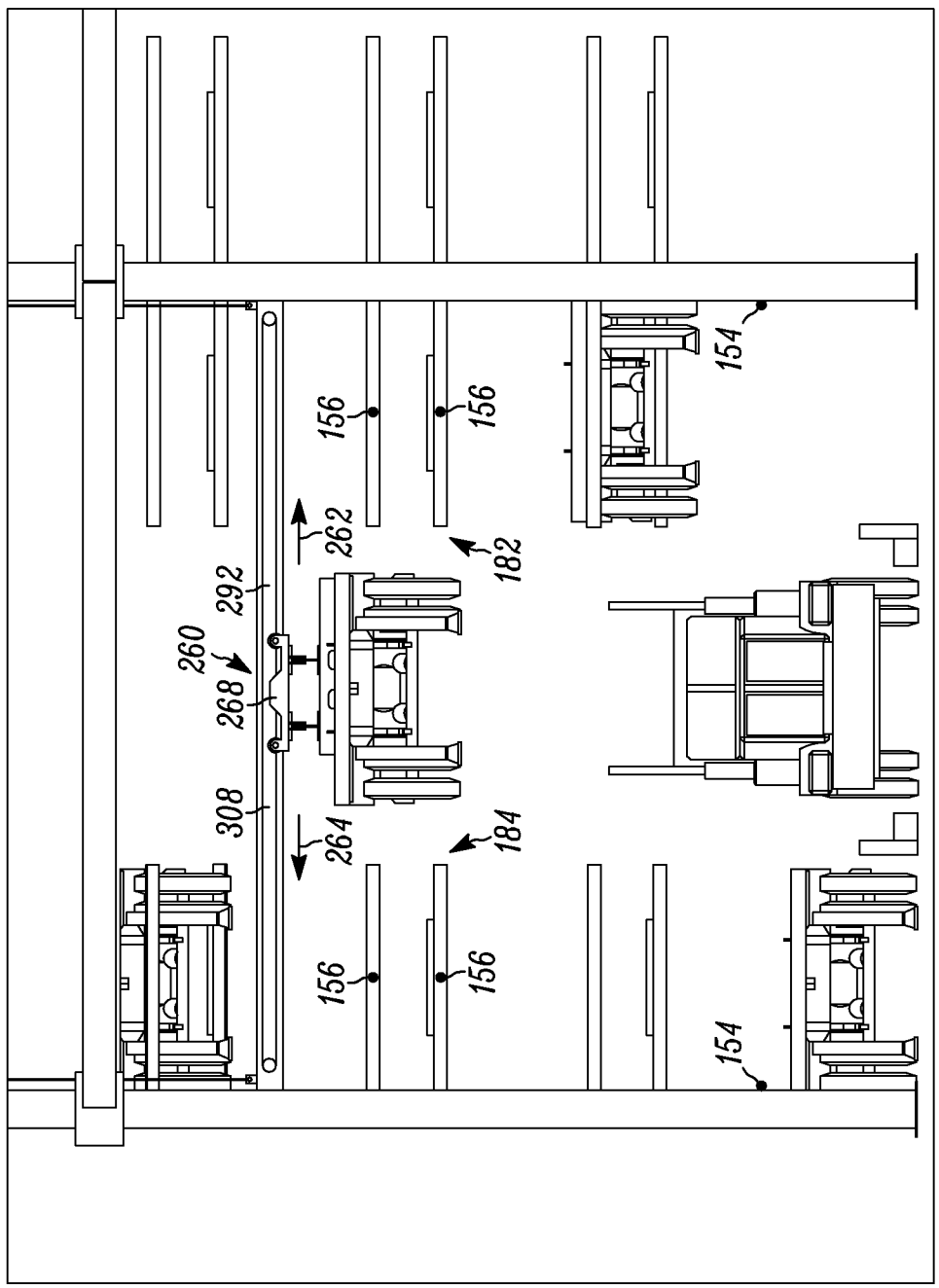

As shown in FIG. 7, the transfer mechanism 230 includes a trolley 260 configured to laterally move a chassis 176 into or out of one of the plurality of shelves 180 from a side, along arrows 262 and 264. Advantageously, this feature allows and facilitates population of the shelves 180 from the side, from an area above the opening 174 laterally along arrows 262 and 264, to a desired shelf.

In one embodiment, as shown in FIGS. 3 and 7, the trolley 260 includes a longitudinal support 266 including an interface 268 with rollers 270 connected to the bow and stern lateral elevation supports 292 and 294 having an opening or channel 308 defining a channel of the hoisting mechanism 290. The trolley 260 is configured to move generally horizontally via the rollers 270 along the channels 308. The channels 308 are complementarily configured to receive rollers 270. This feature provides enhanced trolley movement along arrows 262 and 264 of FIG. 7, for facilitating populating and retrieval of chassis in shelves from the side.

Figure 8:
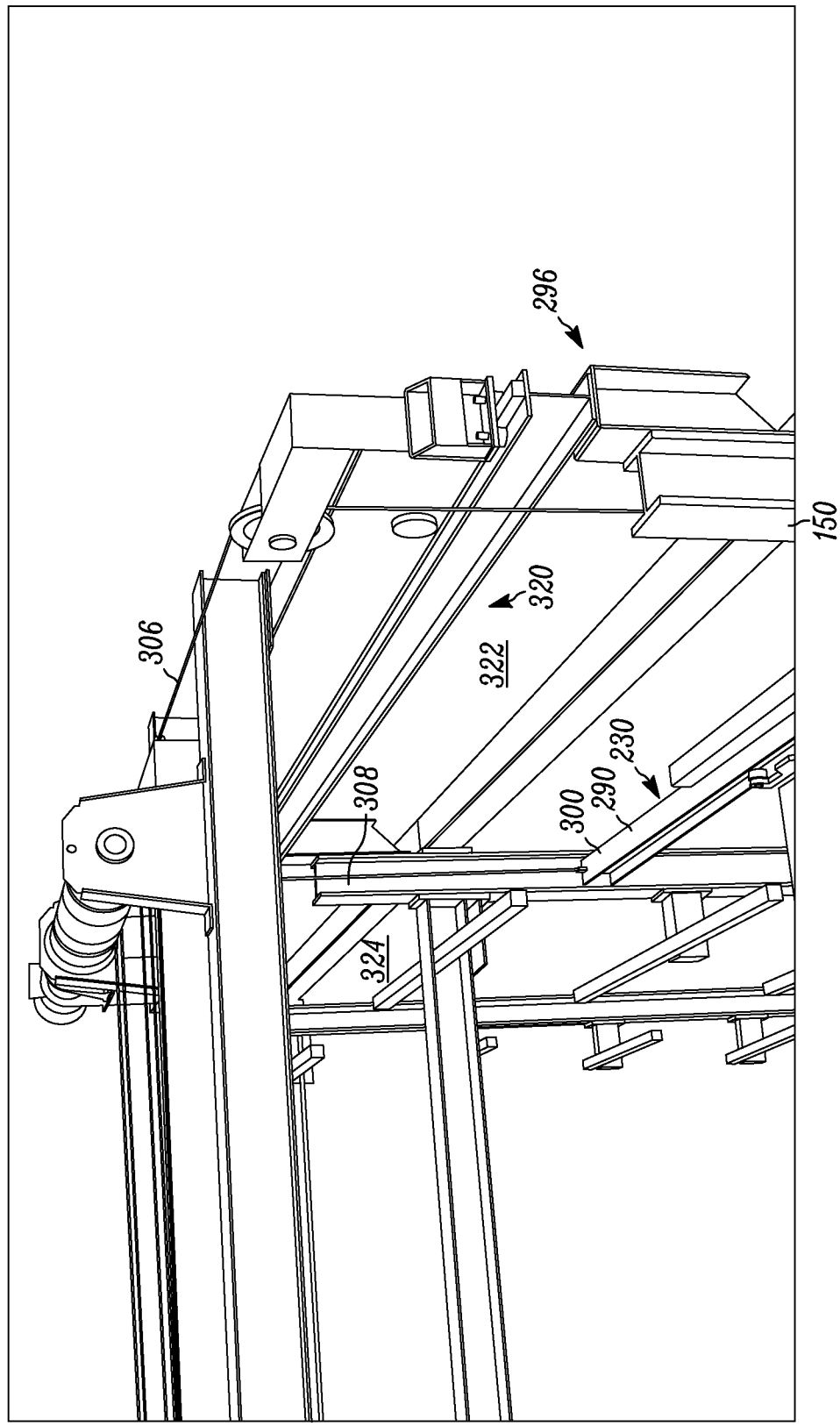
FIG. 8 is an enlarged elevated side perspective view of an embodiment of the system of handling a chassis with a partial view of the hoisting mechanism 290 shown near an upper portion below an overpass region 320, that allows the transfer mechanism 230 in a first module 322 to move to a second module 324, in accordance with the instant invention.
Figure 9:
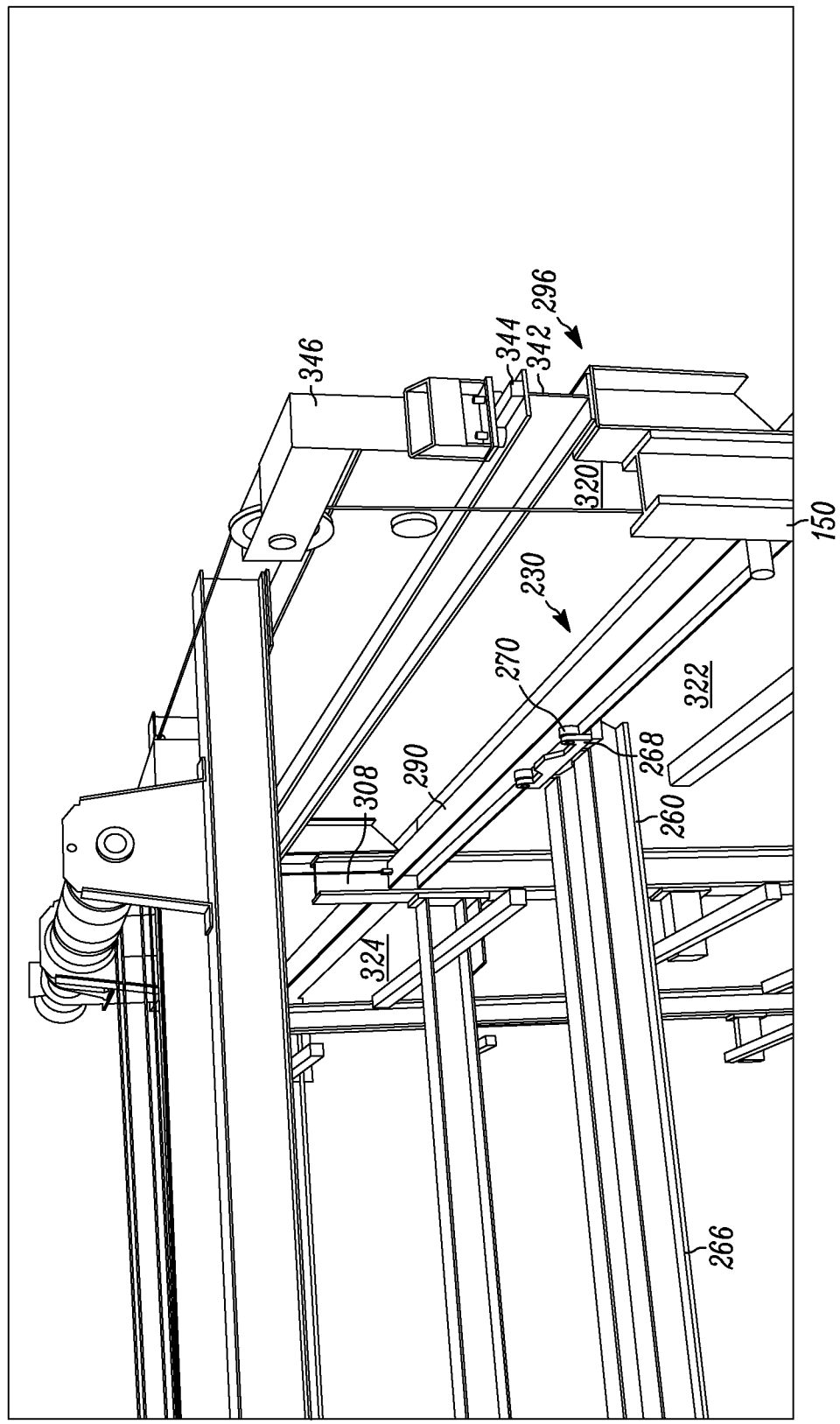
FIG. 9 is an enlarged elevated side perspective view of an embodiment of the system of handling a chassis with a partial view of the hoisting mechanism 290 shown immediately below an overpass region 320, that allows the transfer mechanism 230 to move to a second module 324, in accordance with the instant invention.

Turning to FIG. 8, the method can further include providing a lane changing region 152 or "over pass region" 320 (in FIG. 9-12) of the multi-level structure 150 for the transfer mechanism 230. This feature provides modularity and allows a single transfer mechanism 230 to service multiple lanes or modules 322 and 324, thus being more cost effective, as best shown in FIG. 1.

Figure 10:
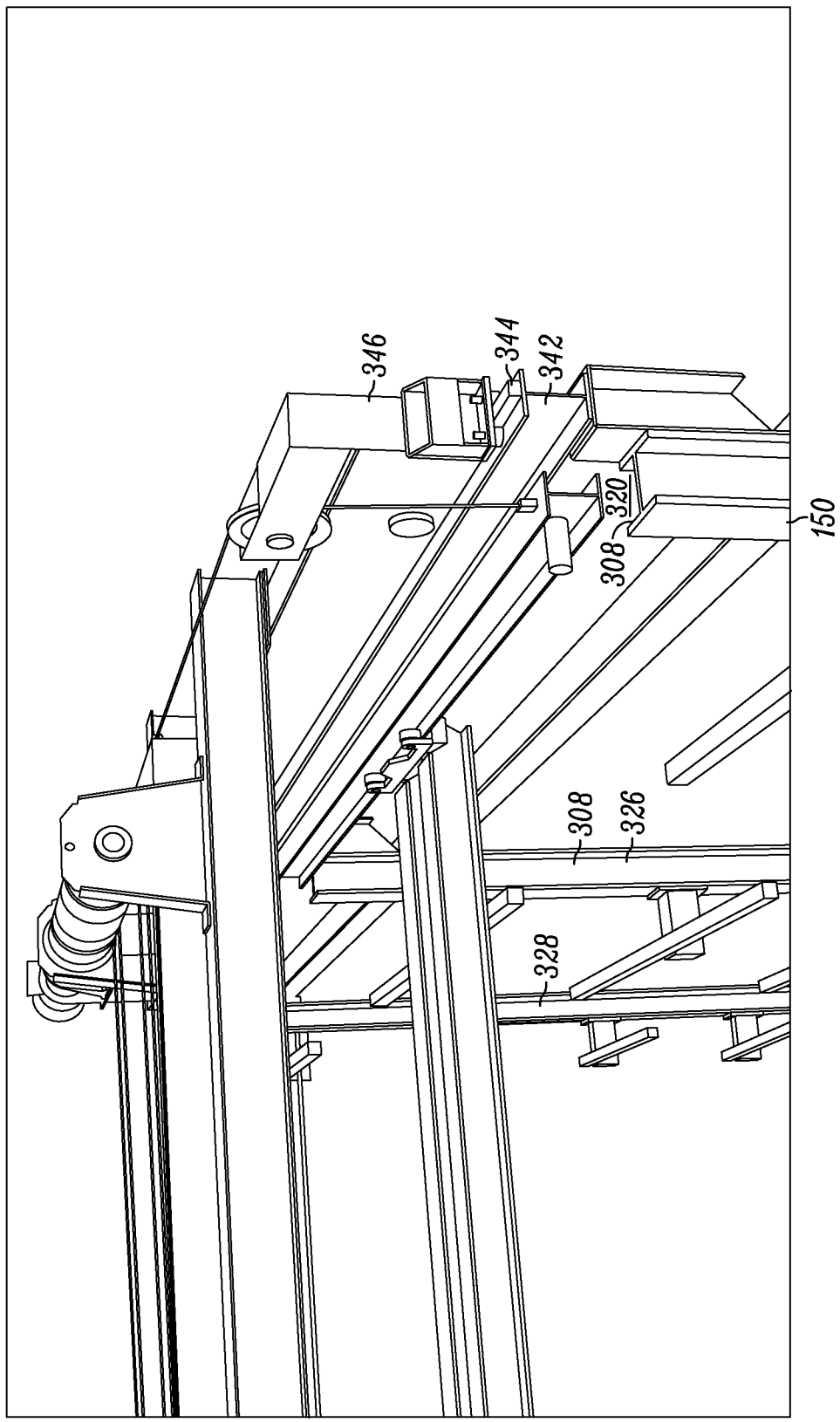
FIG. 10 is an enlarged elevated side perspective view of an embodiment of the system of handling a chassis with a partial view of the hoisting mechanism 290 shown in the overpass region 320, that allows the transfer mechanism 230 to move to a second module 324, in accordance with the instant invention.

Stated differently, the transfer mechanism 230 can be transferred from a first vertical track 326 to a second vertical track 328 by use of the "over pass region" 320, to service two ground lanes, as shown in FIG. 10. In more detail, the transfer mechanism 230 is moved above the first vertical track 326 and moved laterally to a second vertical track 328, as shown for example in FIGS. 10-12. In more detail, the multi-level structure 150 includes providing a plurality of vertical supports 340 with channels 308 configured to partially receive a port end 300 and a starboard end 302 of lateral elevation supports 292 of a hoisting mechanism 290. This structure can be used for the first vertical track 326, second vertical track 328 and subsequent vertical tracks thanks to the modularity of this invention.

In a preferred embodiment, the method includes moving the transfer mechanism 230 to an over pass region 320 and transferring the transfer mechanism 230 to a second module 324 that can be elevated and lowered down the second track 328. This can be done by the use of tracks, as detailed herein. Beneficially, this feature allows modularity or a plurality of lanes to be used, with a single transfer mechanism. Thus, this feature allows a single transfer mechanism to service multiple lanes and modules, which provides enhanced cost effectiveness.

In another embodiment, a system for improved stacking, storing, inventorying and retrieving of chassis, is shown in FIGS. 1 and 7. The system includes: a multi-level structure 150 including a plurality of levels 170 including a first level 172 with an opening 174 to receive a chassis 176 and a second level 178; a plurality of shelves 180 adjacent to the opening 174 including a port shelf 182 and a starboard shelf 184, each configured to receive a chassis; and a transfer mechanism 230 configured to pick a chassis and place it on one of the plurality of shelves 180. Advantageously, the system provides space savings and a relative small footprint, is an efficient, versatile and productive way to store, handle, inventory, densely pack and retrieve chassis in proximity to where they are needed.

Advantageously, the system does not require real time coordination between a system operator and truck driver, thus facilitating the process and making the operation more efficient. In various embodiments, a driver can actuate the system, drop off a chassis or it can be automated, once properly populated in the opening.

In one embodiment, monitor/sensors 156 are located in each of the plurality of shelves 180. This can provide real time inventory monitoring of the shelves 180. Thus, a control center would know where each chassis in the system in located, if desired. Thus, for example, shelves can be monitored and it could be determined that a particular chassis is located in an out of service shelf and a second is located in an in service shelf. The sensors 156 can provide proper alignment in shelves information, as well as tracking and inventory monitoring.

The system can be controlled and/or monitored on site or remotely, by a control center, with real time inventory tracking of chassis in the system. Conversely, manual operation is possible as well. An automation feature can be provided in one embodiment, which includes sensors 190, sensing proper alignment of a chassis in the opening, if properly aligned, actuate the system, as best shown in FIG. 2. The system provides improved and efficient handling of chassis, for storage or retrieval.

The system has particular application in connection with water and rail terminals, distribution hubs, repair shops, warehouses and other areas using chassis. The system provides an unobstructed and easy access structure to store and retrieve a large number of chassis.

In a preferred embodiment, the plurality of shelves 170 are complementarily configured to receive and support conventional chassis. Preferably, each shelf includes laterally extending member 194, as shown in FIG. 2, to provide a complementarily configured dock or rack for receiving a chassis 176 portion securely. This construction is particularly adapted to receive chassis from a side and support from a bottom, in a secure dock like fashion.

As previously detailed with respect to FIGS. 3-7, the transfer mechanism 230 is configured to be lowered to a chassis, connected to the chassis, raised vertically and trolleyed horizontally to side load at least one of the plurality of shelves 180, providing a secure dock or rack for storage and retrieval.

In a preferred embodiment, the transfer mechanism 230 includes a hoisting mechanism 290 including lateral elevation supports 292 and 294 in proximity to a bow 296 and a stern 298, the lateral elevation supports 292 and 294 including a port end 300 and a starboard end 302 configured to move vertically along and partially in a channel 304 comprised of three vertical surface, forming a guide or track 326. The channel 304 provides minimal undesirable sway and stabilization during lateral trolley movement. In more detail, the channel defines a first vertical track 326 complementarily configured to receive the port 300 and the starboard ends 302. The hoisting mechanism 290 includes cables, connected to motor, for raising and lowering.

The chassis system 100 can include imagers 154, sensors and the like being strategically located to precisely provide a real time inventory, precise location of each chassis in the structure 150 and can monitor each step in connection with the method 100. For example, strategically positioned imagers can scan the tractor ID number and take pictures of or video each chassis, when entering and exiting the structure 150. Advantageously, a control station can monitor and operate all stacking activity on site or at a remote location. Advantageously, this can help to eliminate phantom damage claims and can provide locations of each chassis in the structure 150. Thus a driver will not have to search a yard for a chassis. Also, the possibility of damaged chassis being erroneously placed in service can be minimized.

The transfer mechanism 230 includes a trolley 260 configured to laterally move a chassis into or out of one of the plurality of shelves 170 from a side along arrows 262 and 264 in FIG. 7. This structure enhances and facilitates population and retrieval of chassis in the shelves, from the side, and provides simplified access to elevated levels of shelves above the opening, both vertically and laterally. The shelves 180 provide secure docks which are at least partially complementarily configured to receive, securely dock and support many conventional chassis.

As shown in FIGS. 3 and 6, the trolley 260 can include a longitudinal support 266 with interface ends 268 including rollers 270 connected to the lateral elevation supports 292 and 294 having an opening defining a channel 308 of a hoisting mechanism 290. The trolley 260 is configured to move generally horizontally via the rollers 270 along the channels 308. This structure provides secure trolleying, and helps to facilitate population and retrieval of chassis in shelves from the side, along arrows 262 and 264. The channels 308 can be complementarily configured to receive rollers 270.

As should be understood, a variety of designs in connection with cabling, controls, hydraulics, pneumatics and motors would be included, but are not shown in detail in the drawings. This structure can be connected and utilized in various conventional manners, as understood in the art.

In a preferred embodiment, a lane changing region or "over pass region" 320 feature is provided in FIGS. 8-12. The over pass region 320 can be configured to allow the transfer mechanism 230 to be moved from a first vertical track 326 to a second vertical 328 track to allow a single transfer mechanism to service multiple lanes or modules 322 and 324. Stated differently, the system is configured to allow simple movement of the transfer mechanism 230 to the lane changing region and transferring the transfer mechanism to a second module 324 to service a second or subsequent lane. This structure provides cost effectiveness and expandability and modularity of the system.

Figure 11:
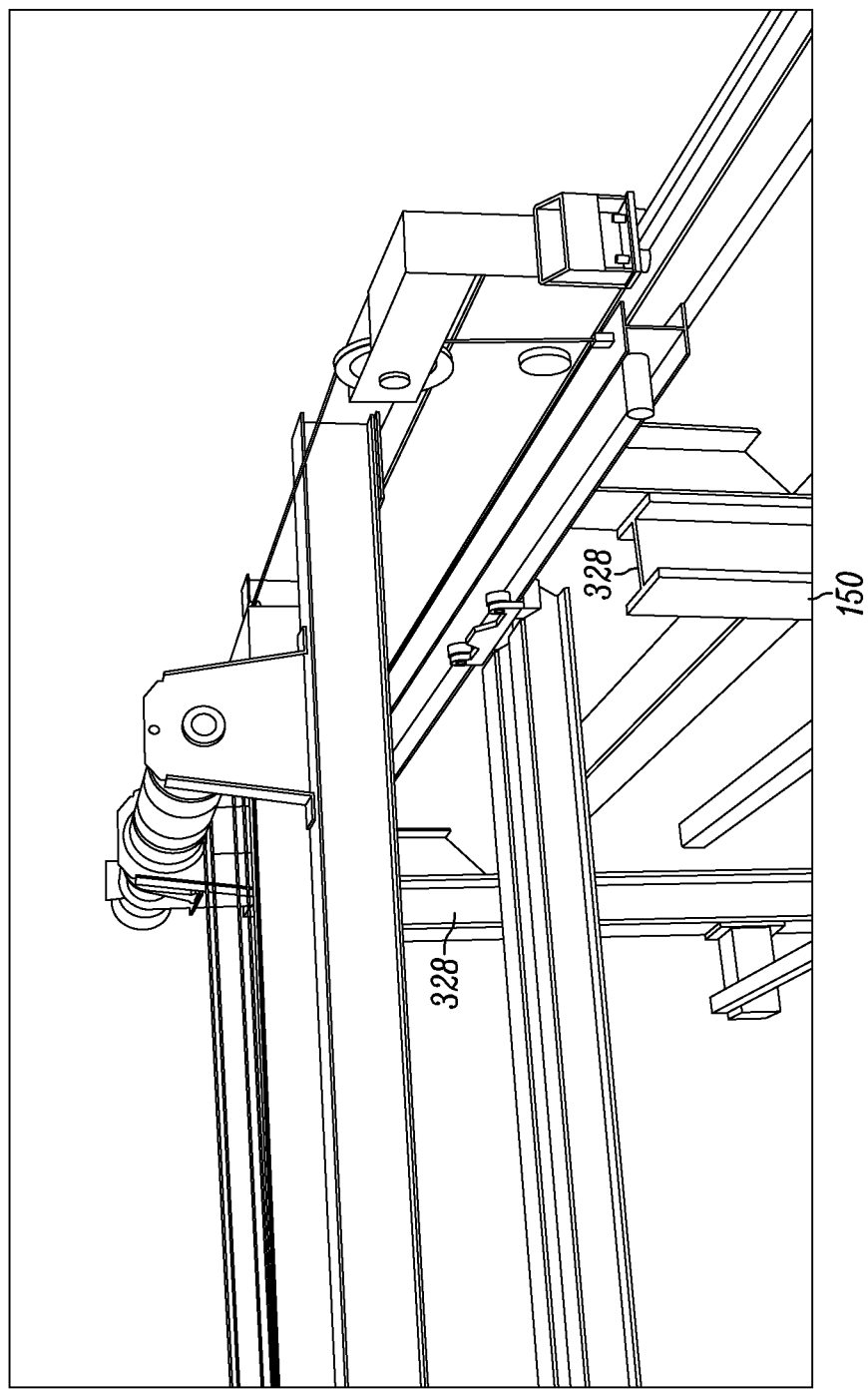
FIG. 11 is an enlarged elevated side perspective view of an embodiment of the system of handling a chassis with a partial view of the hoisting mechanism 290 shown in the overpass region 320, the transfer mechanism 230 is in the process of moving from the first module 322 to a second module 324, in accordance with the instant invention.
Figure 12:
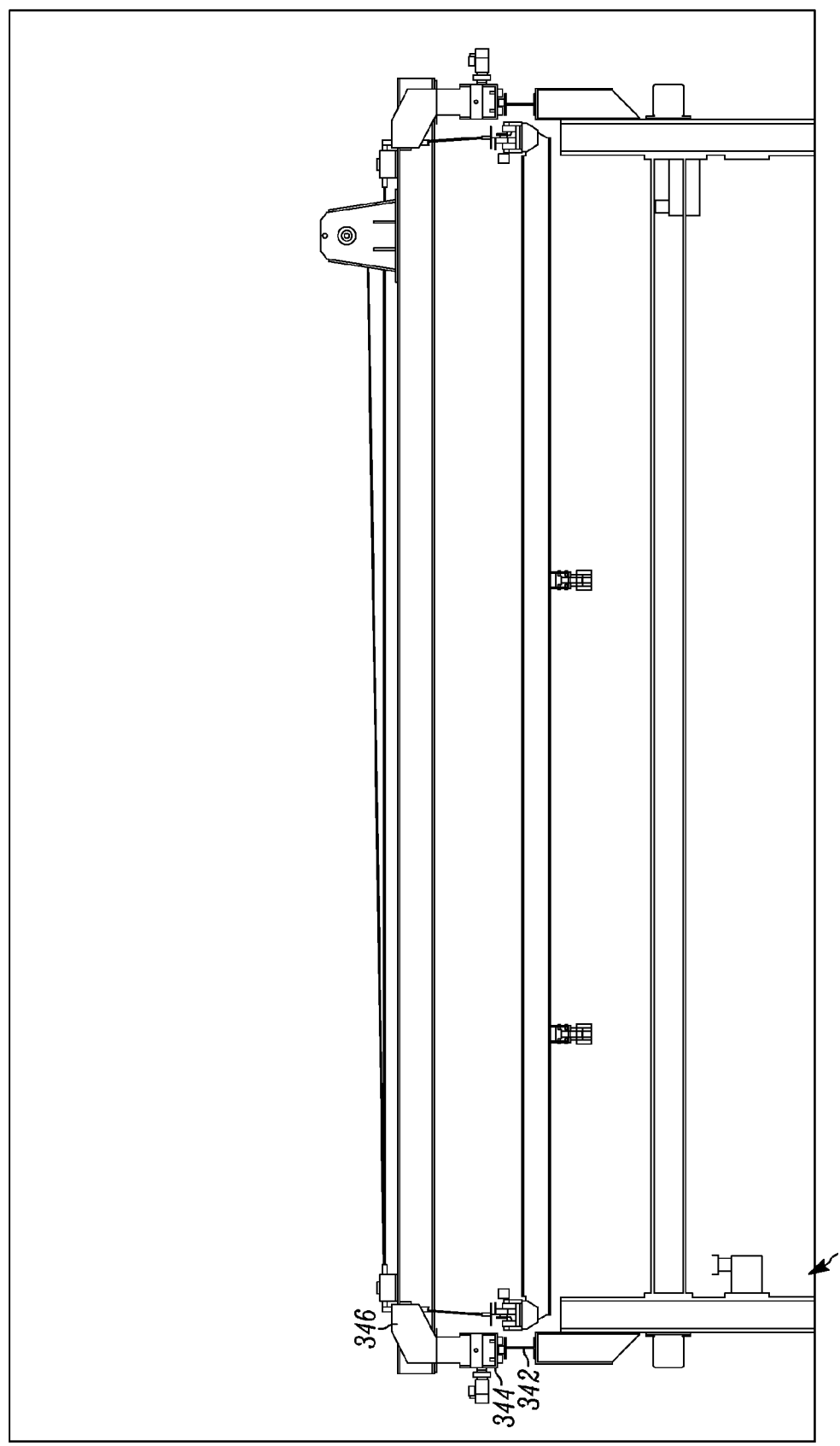
FIG. 12 is an elevated right side view of an embodiment of the system of handling a chassis with a partial view of the hoisting mechanism 290 shown in the overpass region 320, the transfer mechanism 230 is in the process of moving from the first module 322 to a second module 324, in accordance with the instant invention.

In more detail, the over pass region 320 can include raising the transfer mechanism 230 above first track 326; moving the transfer mechanism 230 horizontally along horizontal supports 342 along a horizontal track 344; and transferring the transfer mechanism 230 to a second vertical track 328, as shown in FIGS. 11 and 12. An overpass mechanism 346 moves the transfer mechanism from first module 322 to second module 324. It can be motorized to move it.

Advantages:

1. The system allows an operator to easily sort, with one section including unusable chassis and a second including damaged out of service chassis.

2. Example One: A Chassis Rack System is shown in the figures. The system can vary widely. One embodiment can include two chassis racks with 10 high elevations storing 10 chassis per rack for storage 10 ft wide and 45 ft long, each rack requires 450 sq feet times 2 racks equals 900 sq feet. One 10 ft lane 45 feet long is 450 sq ft for 20 chassis stacking requires approximately 1350 sq feet of land. In contrast, a single level storage system with a similar capacity would require about 14000 sq ft of ground. Thus a multilevel stacking system could require about 10,307 sq feet less than a single level storage area.

3. The number of chassis racks can be set up in pairs and can be erected back to back with 10 ft truck lanes for every chassis rack set. A single chassis rack can also be erected with one or two tractor lanes on either side of the chassis rack.

4. On many occasions truck line carriers return chassis in a damaged condition. A truck line carrier with a damaged chassis may deliberately deposit the chassis in the usable chassis area, that has been serviced and approved to use. This way the truck line carrier prevents a damage claim. In one example, the Handling System can help to minimize chassis damage claims not being reported, called "phantom damage". In one embodiment, a chassis is photographed or taped upon deposit of the chassis, at an inbound rack area. Pictures and video can be taken by imagers 154, to record when a chassis is delivered, identify the truck line carrier tractor, for example on the left hand door, inspect and record the condition and record a storage location of the chassis. This can help to minimize instances of a truck line carrier picking up a damaged chassis.

5. Yet another example includes when a truck line carrier needs to exchange a chassis, he must wait for a crane availability to unload a container off the original chassis and then must find an exchange chassis in the terminal, return to the crane area and have the container lifted off the ground and placed on the exchange chassis. This operation can take 1 to 3 hours depending on the availability of the crane and finding the correct length chassis he is exchanging to carry the container. The chassis rack 10-high system takes 10

As should be understood by those skilled in the art, various modifications and alterations can be made without departing from the spirit and scope of this invention.

What is claimed is:

1. A method for handling container chassis, comprising the steps of:
   providing a multi-level structure including a plurality of levels including a first level with an opening to receive a chassis and a second level;
   providing a plurality of shelves adjacent to the opening including a port shelf adjacent to the opening and a starboard shelf adjacent to the opening, the port shelf and the starboard shelf each configured to receive a chassis; and
   providing a transfer mechanism configured to connect to a chassis to place it on or retrieve it from one of the plurality of shelves, by
      providing a hoisting mechanism including a first lateral elevation support in proximity to a bow and a second lateral elevation support in proximity to a stern, the first and second lateral elevation supports each include a port end and a starboard end, and the first and second lateral elevation supports are configured to move vertically along and partially in a vertical channel defining a vertical track;
      providing a trolley configured to laterally move the chassis into or out of one of the plurality of shelves from a side;
      providing the trolley with a longitudinal support including an interface with rollers connected to the first and second lateral elevation supports, the first lateral elevation support including at least a first lateral channel, the second lateral elevation support including at least a second lateral channel, the trolley being configured to move horizontally via the rollers along the first and second lateral channels, the longitudinal support being disposed above the chassis when the transfer mechanism is connected to the chassis; and
      providing an interconnecting structure connected to the longitudinal support including a plurality of claw structures configured to receive and connect to the chassis.

2. The method of claim 1 wherein the plurality of shelves are complementarily configured to receive and support the chassis.

3. The method of claim 1 wherein the transfer mechanism is configured to be lowered to the chassis, connected to the chassis, raised and trolleyed to side load at least one shelf generally horizontally with the trolley.

4. The method of claim 1 further comprising sensing and displaying proper alignment of the chassis in the opening, prior to movement of the transfer mechanism.

5. The method of claim 1 further comprising providing a lane changing region for the transfer mechanism.

6. The method of claim 1 wherein the vertical track is a first vertical track, the method further comprising transferring the transfer mechanism from the first vertical track to a second vertical track.

7. The method of claim 6 wherein the step of transferring further includes raising the first and second lateral elevation supports above the first vertical track.

8. A system for stacking container chassis, comprising:
   a multi-level structure including a plurality of levels including a first level with an opening to receive a chassis and a second level;
   a plurality of shelves adjacent to the opening including a port shelf adjacent to the opening and a starboard shelf adjacent to the opening, the port shelf and the starboard shelf each configured to receive a chassis;
   a transfer mechanism configured to connect to a chassis to place it on or retrieve it from one of the plurality of shelves, the transfer mechanism including a hoisting mechanism, the hoisting mechanism including a first lateral elevation support in proximity to a bow and a second lateral elevation support in proximity to a stern, the first and second lateral elevation supports each include a port end and a starboard end, and the first and second lateral elevation supports are configured to move vertically along and partially in a vertical channel defining a vertical track; the transfer mechanism further comprises a trolley configured to laterally move the chassis into or out of one of the plurality of shelves from a side, the trolley including a longitudinal support including an interface with rollers connected to the first and second lateral elevation supports, the first lateral elevation support including at least a first lateral channel, the second lateral elevation support including at least a second lateral channel, the trolley configured to move horizontally via the rollers along the first and second lateral channels; and an interconnecting structure connected to the longitudinal support including a plurality of claw structures configured to receive and connect to the chassis, wherein the longitudinal support is above the chassis when the transfer mechanism is connected to the chassis.

9. The system of claim 8 wherein the plurality of shelves are complementarily configured to receive and support the chassis.

10. The system of claim 8 wherein the transfer mechanism is configured to be lowered to the chassis, connected to the chassis, raised vertically and trolleyed horizontally to side load at least one of the plurality of shelves.

11. The system of claim 8 wherein the vertical track is a first vertical track, the system further comprising a lane changing region configured to allow the transfer mechanism to be moved from the first vertical track to a second vertical track.

12. The system of claim 8 wherein the interconnecting structure includes four claw structures each claw structure including three connection points including a first connection, a second connection and a third connection during a chassis lift and free of a connection after a chassis placement.

* * * * *